(12) United States Patent
Kimelman et al.

(10) Patent No.: US 7,243,206 B2
(45) Date of Patent: Jul. 10, 2007

(54) METHOD AND APPARATUS FOR USING A RAM MEMORY BLOCK TO REMAP ROM ACCESS REQUESTS

(75) Inventors: Paul Kimelman, Alamo, CA (US); Ian Field, Walnut Creek, CA (US)

(73) Assignee: ARM Limited, Cambridge (GB)

( * ) Notice: Subject to any disclaimer, the term of this patent is extended or adjusted under 35 U.S.C. 154(b) by 245 days.

(21) Appl. No.: 10/412,693

(22) Filed: Apr. 14, 2003

(65) Prior Publication Data

US 2004/0205318 A1 Oct. 14, 2004

(51) Int. Cl.
G06F 12/12 (2006.01)
(52) U.S. Cl. ................................ 711/202; 711/209
(58) Field of Classification Search ........ 711/100–103, 711/202; 714/7–8; 712/37
See application file for complete search history.

(56) References Cited

U.S. PATENT DOCUMENTS

| | | | | |
|---|---|---|---|---|
| 4,141,068 A | * | 2/1979 | Mager et al. | 711/103 |
| 4,603,399 A | * | 7/1986 | Cheek et al. | 711/202 |
| 4,610,000 A | * | 9/1986 | Lee | 365/189.02 |
| 4,802,119 A | * | 1/1989 | Heene et al. | 714/7 |
| 4,982,360 A | | 1/1991 | Johnson et al. | |
| 5,212,693 A | * | 5/1993 | Chao et al. | 714/5 |
| 5,408,672 A | * | 4/1995 | Miyazawa et al. | 712/37 |
| 5,757,690 A | * | 5/1998 | McMahon | 365/104 |
| 5,829,012 A | * | 10/1998 | Marlan et al. | 711/102 |
| 5,950,012 A | * | 9/1999 | Shiell et al. | 717/169 |
| 6,073,252 A | * | 6/2000 | Moyer et al. | 714/7 |
| 6,158,018 A | * | 12/2000 | Bernasconi et al. | 714/8 |
| 6,304,950 B1 | | 10/2001 | Inoue et al. | |

(Continued)

FOREIGN PATENT DOCUMENTS

EP WO 9208231 * 5/1992 ................ 365/52

(Continued)

*Primary Examiner*—Donald Sparks
*Assistant Examiner*—Jesse Diller
(74) *Attorney, Agent, or Firm*—Nixon & Vanderhye P.C.

(57) ABSTRACT

A method and data processing apparatus for remapping selected data access requests issued by a processor for accessing data items stored on a ROM. The method comprises the following steps: storing at least one replacement data item corresponding to at least one data item and different to said at least one data item in a portion of a RAM memory block, said RAM memory block being accessible by said processor, and said portion having been defined for storage of said at least one replacement data item; intercepting a data access request from said processor to said ROM; comparing at least a portion of an address of said intercepted data access request with a stored at least one identifier, said stored at least one identifier identifying an address of at least one data item stored on said ROM, and depending on said comparison either: remapping said data access request to said RAM memory block, such that a replacement data item stored on said memory block is accessed if said comparison indicates said at least a portion of an address to correspond to an address identified by said at least one identifier; or if said comparison indicates said at least a portion of an address not to be an address identified by said at least one stored identifier accessing a data item located at a position corresponding to said address on said ROM.

32 Claims, 7 Drawing Sheets

U.S. PATENT DOCUMENTS

| | | |
|---|---|---|
| 6,463,549 B1 * | 10/2002 | Shperber et al. ............... 714/7 |
| 6,530,005 B2 | 3/2003 | Koschella et al. |
| 6,804,772 B2 * | 10/2004 | Lee et al. ................... 712/248 |
| 2001/0052114 A1 | 12/2001 | Koh et al. |
| 2002/0120810 A1 * | 8/2002 | Brouwer .................... 711/103 |
| 2003/0051119 A1 * | 3/2003 | Li et al. ..................... 711/210 |
| 2003/0196051 A1 | 10/2003 | Mahrla |
| 2004/0015939 A1 * | 1/2004 | Cheah et al. ............... 717/168 |
| 2005/0010745 A1 * | 1/2005 | Lee et al. ................... 712/248 |

FOREIGN PATENT DOCUMENTS

| | | | |
|---|---|---|---|
| EP | 0 688 138 | | 12/1995 |
| GB | 2 317 972 | | 4/1998 |
| JP | 2002149431 | * | 5/2002 |
| WO | WO 02/39457 | | 5/2002 |
| WO | WO 02/099650 | | 12/2002 |

* cited by examiner

METHOD AND APPARATUS FOR USING A RAM MEMORY BLOCK TO REMAP ROM ACCESS REQUESTS

BACKGROUND OF THE INVENTION

1. Field of the Invention

This invention relates to the field of data processing systems. More particularly, this invention relates to the remapping of selected data access requests.

2. Description of the Prior Art

Data processing systems often use read only memory, ROM for storing information. One example of such a ROM is a flash device, this can be viewed effectively as a read only memory as it is only writable to under certain extremely restrictive conditions. One drawback of many ROMs and of flash devices in particular is that they can be slow to access. Thus, when operating code that is stored on a flash, it is generally copied to the SRAM prior to being executed. Not only does this increase the speed of execution of the code, it also allows portions of it to be overwritten. Thus, literals in the code can be updated and if the code is to be debugged then breakpoints can be inserted into the code.

In some circumstances, however, in particular, in small processing systems such as mobile phones, the Flash may be used to execute the code stored on it. This means that effective debugging of the code, or any system overwrite of literals, instructions or other data is not feasible.

Figure 1:
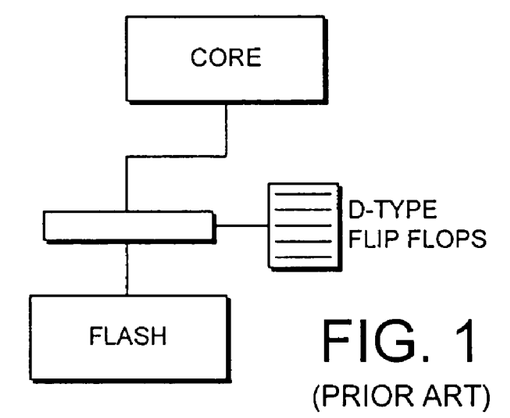
FIG. 1 schematically illustrates a data access request remapping device according to the prior art.

One way in which this problem has been addressed is to provide a means of intercepting data access requests from the core to the Flash with the ability in selected circumstances of capturing the intercepted data access requests and supplying from a special storage location, in which replacement data is stored. This provides effective overwriting of the stored data as far as the core is concerned, although in reality the stored data is not altered. This has conventionally been done by inserting an intercepting device, which can be configured as a cache and contain a block range ("line") of replacement data, into the bus that routes data requests from the core to the Flash device. This device intercepts data access requests from the core to the Flash and compares the address of the data item to be accessed with some addresses that it has stored. If there is a match then it supplies the data from its own store. This replacement data item is stored in a special storage location consisting of D-type flip flops. In this way data access requests to certain data items never reach the Flash, rather the replacement items stored in the D-type flip flops are returned to the core. As far as the core is concerned the data items have been overwritten. A figure schematically showing this prior art device is shown in FIG. 1. As can be seen the data interceptor lies in the bus between the Flash and core and is connected to a set of D type flip flops that are used to store the replacement data items.

A problem with these devices of the prior art is that sufficient dedicated D-type flip flops for storing as many replacement data items as may be needed are required. These are only used for this purpose and thus, this way of providing a replacement of a data access request is expensive.

SUMMARY OF THE INVENTION

Viewed from one aspect the present invention provides a method for remapping selected data access requests issued by a processor for accessing data items stored on a ROM, said method comprising the following steps: (ii) storing at least one replacement data item corresponding to at least one data item and different to said at least one data item in a portion of a RAM memory block, said RAM memory block being accessible by said processor, and said portion having been defined for storage of said at least one replacement data item; (iii) intercepting a data access request from said processor to said ROM; (iv) comparing at least a portion of an address of said intercepted data access request with a stored at least one identifier, said stored at least one identifier identifying an address of at least one data item stored on said ROM, and depending on said comparison either: ($v_a$) remapping said data access request to said RAM memory block, such that a replacement data item stored on said memory block is accessed if said comparison indicates said at least a portion of an address to correspond to an address identified by said at least one identifier; or ($v_b$) if said comparison indicates said at least a portion of an address not to be an address identified by said at least one stored identifier accessing a data item located at a position corresponding to said address on said ROM; and (vi) forwarding said accessed data to said processor.

The present invention recognises the above problem that the use of dedicated D-type flip flops for the purpose of storing replacement data is expensive in processor area and it addresses this problem by using a defined portion of a RAM memory block for storing the replacement data. This has several advantages. The RAM memory is already present in the device and thus, this solution to the problem reduces the number of additional devices that need to be added to the processing device. Furthermore, the portion of the RAM memory defined for storage of the replacement data only needs to be defined for this purpose while the replacement data is needed and thus, it can be used to store other data when the replacement data is no longer required. A further point is that the amount of memory that is defined can be chosen depending on the task to be performed and the number of replacement data items required. This leads to a very efficient use of memory and considerably reduces the overheads that the use of this sort of patch traditionally entails. Further, unlike a cache-like mechanism, remapping uses standard bus protocols and behaviour.

In some embodiments said method comprises a further step, step (i) said step being performed before step (ii) and comprising: (i) storing at least one identifier identifying an address of at least one data item stored on said ROM.

The identifier identifying an address of at least one data item stored on said ROM may be settable by the method, for example it may be entered by a debugging program. Alternatively, in other embodiments the identifier is stored in some position on a permanent memory on the processor and thus step (i) is not performed by the method.

Similarly, in some embodiments said method comprises the further step of: defining a portion of a RAM memory block for storage of said at least one replacement data item prior to performing step (ii).

A portion of a RAM memory block may be defined by the method, for example it may be defined by the debugger on the host. Alternatively, in other embodiments the portion of the RAM memory that is defined is a constant that is stored on some permanent memory on the processor and this step is therefore not performed by the method.

Although in some embodiments step (ii) comprises storing a single replacement data item in said RAM, preferably step (ii) comprises storing a plurality of replacement data items in said RAM corresponding to a plurality of data items stored in said ROM. In this case at least a portion of said address of said corresponding data item is stored associated with each of said plurality of replacement data items. It should be noted that the plurality of replacement data items are generally non-contiguous.

It should be noted that the designer can in some application select the number of replacement data items (such as breakpoints) required. Which affects the size of SRAM that needs to be allocated and also may affect the size of the portion of address to be compared and thus the number of gates of the comparator.

In preferred embodiments, when the comparison of the associated stored at least a portion of said address with a corresponding at least a portion of said data item address indicates that there is no replacement data item stored in the RAM corresponding to the data item to be accessed, step ($V_b$) of said method is performance rather than step ($V_a$).

In preferred embodiments said at least one identifier comprises a portion of said address of said at least one data item.

Preferably, step (i) comprises storing an identifier identifying a data area on said ROM in which a plurality of data items are stored.

Although a plurality of identifiers identifying a plurality of data items can be used, in preferred embodiments only one identifier is used. This identifier identifies a data area on said ROM in which a plurality of data items are stored. In the case of a small area of ROM, it may indicate the entire area of the ROM if the entire ROM is patchable, although generally it relates to a particular "patchable" area within the ROM. In effect, the identifier relates to certain bits of the address of the data items that are common to that particular data area. Thus, in effect a certain patchable area on the ROM is defined, and data access requests to data items in this area can be re-routed to replacement data items. It should be noted that the number of bits required for the identifier depends on the system, on the size of the flash and on the size of the area to be patched.

In preferred embodiments, said identifier comprises a different portion of said address or said portion of said address that is stored associated with said replacement data items. Preferably, said identifier comprises a higher order portion of said address and said portion of said address that is stored associated with said replacement data item comprises a lower order portion of said address.

Generally, the high order portion of the address is common to several data items and relates to the area where they are stored, and the lower portion area of the address can be seen as tags that are specific to each data item. Furthermore, the size of the stored portion of the address associated with the replacement data item and necessary to uniquely identify it will depend on the size of the ROM that can be "patched" (i.e. on the number of storage locations present in that area). This can be set by the system designer depending on the actual embedded flash used as well as application space. This will affect the number of gates required for comparing this portion of the address. This is therefore a further example of how embodiments of the invention are highly parameterisable by the system designer. The system designer is able to adapt a particular embodiment such that as few gates as is necessary are used for the task in hand.

In some embodiments, the method of the present invention can be used to assist in the debugging of code stored in a read-only memory. In this case the at least one replacement data item comprises a breakpoint, such that access to said at least one replacement data item causes debug state to be entered. In this way the method according to the present invention can be used to insert breakpoints at specified locations within the code stored on the read-only memory.

In other embodiments, said at least one data items comprises an instruction, literal, or other data and said at least one replacement data item comprises a new instruction, literal, or other data to replace said instruction, literal, or other data stored in said ROM.

Embodiments of the present invention can be used to effectively overwrite instructions, literals, or other data that are stored in read-only memory. Thus, although the data is stored in permanent memory it can effectively be updated or the memory can effectively be "patched" using embodiments of the present invention.

In some embodiments, step (ii) of said method is performed in response to a request received from a processor. It may be advantageous for an external processing system to be able to initiate step (ii) such that data items such as literals that need updating can be entered in response to a signal from a processing system. For example, in an automobile control system, it may be convenient for one of the devices controlling, for example, the windscreen wipers to be able to update its literals from a different part of the automobile system in certain circumstances.

In some embodiments, the ROM comprises a flash device or other programmable ROM. Flash devices are generally viewed as read-only memory as they are extremely awkward to overwrite. Patching methods according to embodiments of the present invention can therefore be particularly appropriate for use with such devices.

In some embodiments step (vi) comprises a delaying step prior to forwarding said access data item to said processor, said delaying step being arranged such that the data is forwarded with a timing that is equal to the timing of data accesses to said flash device.

Access to the flash device is extremely slow, and one of the advantages of embodiments of the present invention is that the data interception and remapping of the data access can all be performed before the original data access would have been returned from the flash. In some situations it may be advantageous to delay the remapped data access such that the data item is forwarded to the processing with the timing that would have occurred had the flash device itself been accessed. Thus, the processor is unaware that remapping has occurred and will function in its normal manner.

In preferred embodiments, said RAM memory block comprises an SRAM.

A further aspect of the present invention comprises a processor; a read only memory for storing data items, said read only memory being accessible by said processor; a memory block of RAM accessible by said processor and operable to store at least one replacement data item corresponding to at least one data item stored in said ROM and different to said at least one data item in a portion of a RAM memory block, said portion having been defined for storage of said at least one replacement data item; a data request interceptor comprising a data store and a comparator; wherein said data store is operable to store at least one identifier, said at least one identifier identifying an address of said at least one data item stored on said ROM; and said data request interceptor is operable to intercept data access requests issued by said processor to said ROM and using said comparator to compare at least a portion of an address of said intercepted data access request with said stored at least one identifier and depending on said comparison said data request interceptor is operable to either: access data located at a position corresponding to said intercepted data access request address on said ROM if said comparison indicates said at least a portion of an address not to be an address identified by said at least one stored identifier; or to remap said data access request to access said at least one replacement data item if said comparison indicates said at least a portion of an address to be an address identified by said at least one stored identifier.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 2:
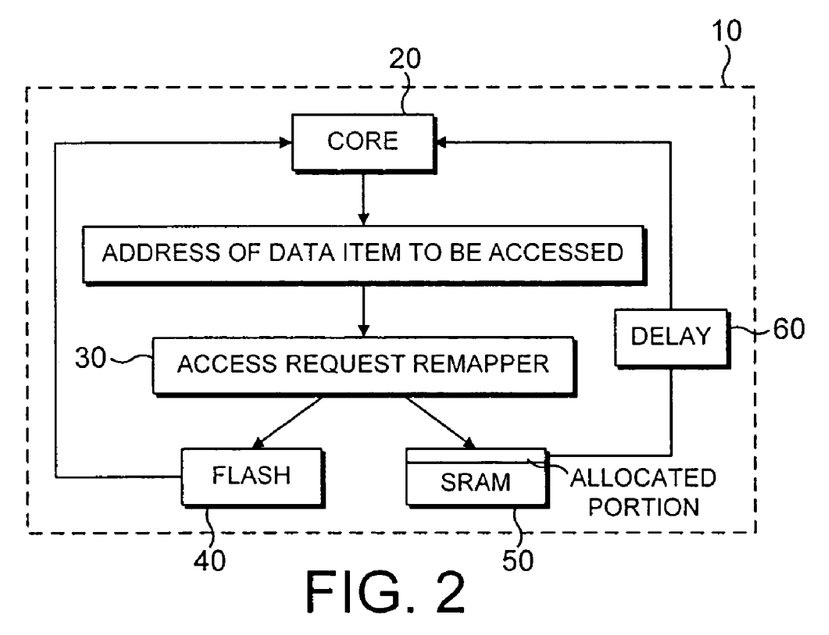
FIG. 2 schematically illustrates a simple data access request remapping device according to an embodiment of the present invention.

FIG. 2 schematically shows a simple implementation of an embodiment of the present invention. FIG. 2 shows a processor core 20, an access request remapper 30, Flash 40, and SRAM 50. The access request remapper is operable to remap selected data access requests that are attempting to access data stored on the Flash 40 to replacement data stored on the SRAM 50.

In this embodiment the core or processor 20 of a data processing apparatus 10 issues a data access request. This access request is intercepted by an access request remapper 30. The access request remapper compares at least a portion of the access request address with a stored identifier. The stored identifier is used to identify the data items that should be replaced with replacement items and is generally a portion of the address of the data item to be replaced. Depending on the result of the comparison the data access request may be forwarded to an address in the Flash or it may be remapped to access a replacement data item which is stored in an allocated portion of the SRAM. As far as the core is concerned, the data item that was previously stored in the flash has been overwritten by the replacement data item as the core is unaware of the remapping occurring.

Owing to the slow access time of Flash 40 a data access request to the flash can be remapped and replacement data accessed all within the time that a data access to Flash 40 would usually have occurred. In some embodiments where it is important that a data access takes a particular time, then a delay (60) may be input into the remapped access request to the SRAM or into the data return line to the core (as shown) such that data is returned in the same time frame as it would have been returned had the flash itself been accessed rather than replacement data in the SRAM.

Figure 3:
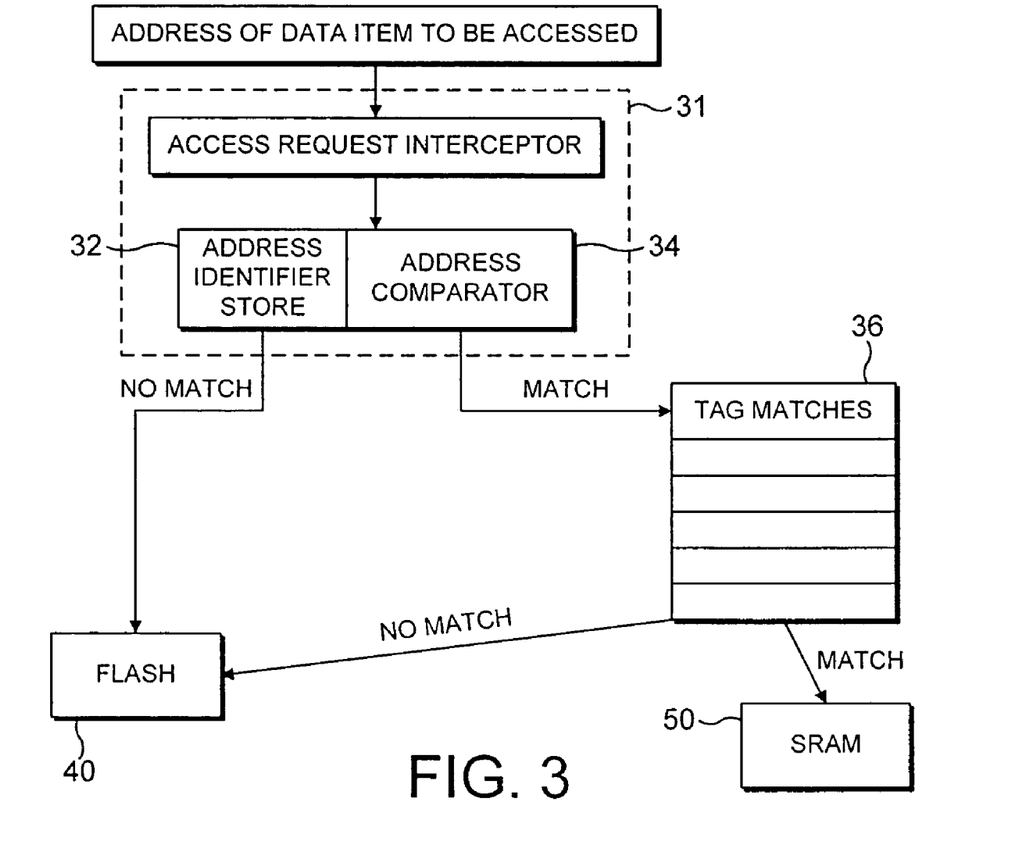
FIG. 3 schematically illustrates a further data access request remapping device according to an embodiment of the present invention.

FIG. 3 schematically illustrates a data access request remapping device 31 according to an embodiment of the invention. This device comprises an access request interceptor, a data store 32 for storing an address identifier and a comparator 34, for comparing a portion of the address of the data access request and the identifier stored in the data store 32. In this embodiment, a data access request issued by the processor is intercepted by access request interceptor and a portion of the address of the data access request is compared with an address identifier stored in data store 32.

The address identifier is generally a higher bit portion of the address of a data item to be remapped. This portion may relate to an area on the flash, all data items within this area being identifiable by this portion of their address. In this case, any data item within this area on the Flash may be remapped depending on some further conditions outlined below. In effect this data area can be patched, and replacement data items can be provided for any data items stored within this area.

If the address comparator 34 records a match then the data item to be accessed is stored in the patchable region of the flash and a further portion of the address, or the "tag" is compared with stored tag data. The stored tag data and comparator are shown as block 36. There is stored tag data for each replacement data item stored in SRAM, the stored tag data comprising a further portion of the data item address. This further portion of the address should be sufficient to uniquely identify where in the patchable area of the flash the data item may be found. Thus, the number of bits required for this portion depends on the size of the patchable data area. If a match of tag data occurs, then the data access request is rerouted to access the replacement data item. The replacement data item is stored in a defined portion of the SRAM, generally at a position indicated by the tag portion of the address. If a match is not found then this indicates that there is no replacement data item for that particular data item although it is found in a portion of the Flash that can be remapped. In this case the data access request is routed to the Flash and no remapping occurs.

Figure 4:
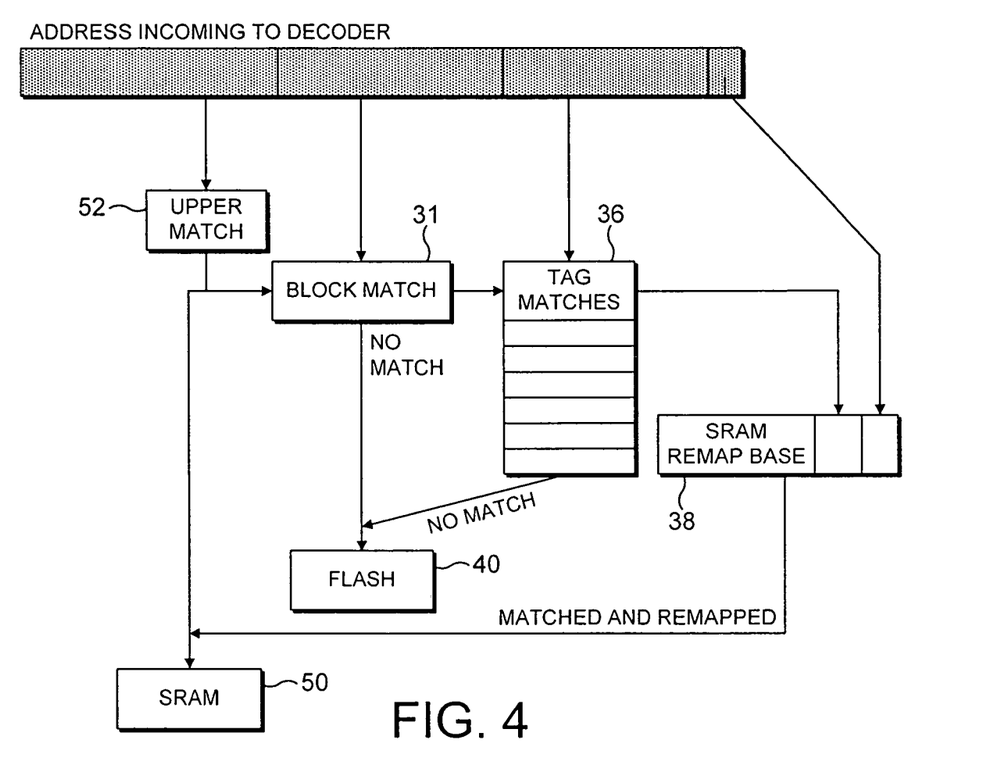
FIG. 4 schematically illustrates a data access request remapping device according to an embodiment of the present invention with the Flash and SRAM areas being pre-assigned.

FIG. 4 illustrates a memory control unit that has pre-assigned Flash and SRAM areas. In this embodiment, there is first an "upper match", which comprises a comparison of the higher order portion of the address with a stored value. This comparison may be an exact bit comparison or it may contain many don't care bits (see for example the embodiment of FIG. 5). As the Flash and SRAM areas are pre-assigned this value indicates whether the data item to be accessed is to be found on the Flash or SRAM. If it is to be found on the Flash then it is routed to a data interceptor according to an embodiment of the invention. The data interceptor compares a further portion of the address with a stored identifier. This is similar to the address comparison of FIG. 3, and indicates if the data item to be accessed on the Flash is to be found in an area where data items may be remapped or not. If there is a match then the tag of the address is then compared with stored tags to see if there is a replacement data item for that data item or not. If there is not then the data access instruction is routed to the Flash and the data item stored at the address is accessed. If there is a tag match then the data access request is routed to the SRAM and a replacement data item is accessed.

In this embodiment as the replacement data items are stored within a fixed area of the SRAM. The size of this area can be set by the system designer and will depend on actual embedded flash used as well as application space. The size of the area will affect the size of the tag required which in turn affects the number of gates needed. Thus, the tag can be smaller than the address needed to identify the replacement data item in the SRAM. This is an advantage as fewer gates are needed for the comparator. As the replacement data item stored in the SRAM is found in a set area, the upper portion of the address of the replacement data will point to this area and will be the same for all replacement data items. The next portion of the address is used as tag data to individually identify each replacement data item. When mapping to the replacement item in SRAM, the lowest bits of the address are added to the portions of the address used in the comparison. This is needed as the SRAM is addressed by bytes, while the patch is identified on a word basis.

Figure 5:
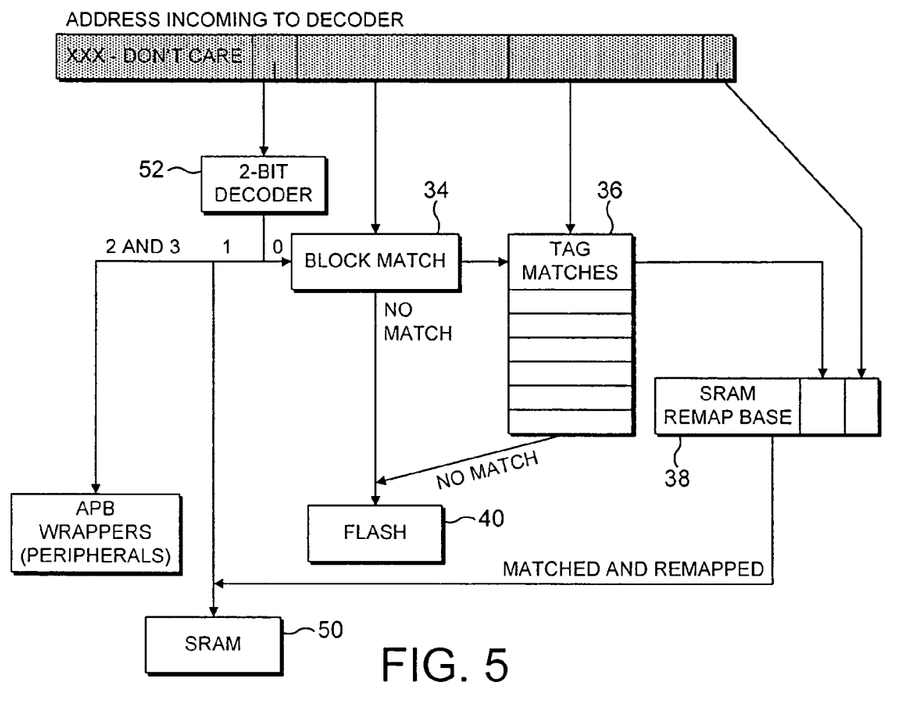
FIG. 5 schematically illustrates a data access request remapping device according to an embodiment of the present invention with the Flash and SRAM areas being pre-assigned and having a fixed maximum value.

FIG. 5 illustrates a further embodiment of a data access remapping system according to an embodiment of the present invention. In this embodiment, as in the embodiment of FIG. 4 Flash 40 and SRAM 50 areas are pre-assigned. This case, however, is the most specific with a fixed maximum area for the SRAM and Flash which in this embodiment is 256K of Flash and 256K of SRAM. In the upper match 52, which identifies if the data item to be accessed is in the Flash 40 or not, only two bits are needed to identify if the address relating to a data item is stored in the SRAM, Flash or in any peripherals. Thus, the upper match of FIG. 4 is a 2-bit decoder. A 0 from this decoder, indicates the data to be stored in the Flash and thus, a data interceptor for providing selective remapping of the data access request is provided at this point. The block match can then be used to determine if the data item to be accessed is within the patchable region or not. This region may have any size, but is often 32K or 64K. If the data item to be accessed lies within this region then a tag match is performed to see if there is a replacement data item for this item or not. In a system with a fixed size flash of say 256K and a fixed patchable area of 32K, the portion of the address used in the block match and upper address match are ROM constants that are input to the comparator and may be shared with the Flash bus wrapper.

Figure 6:
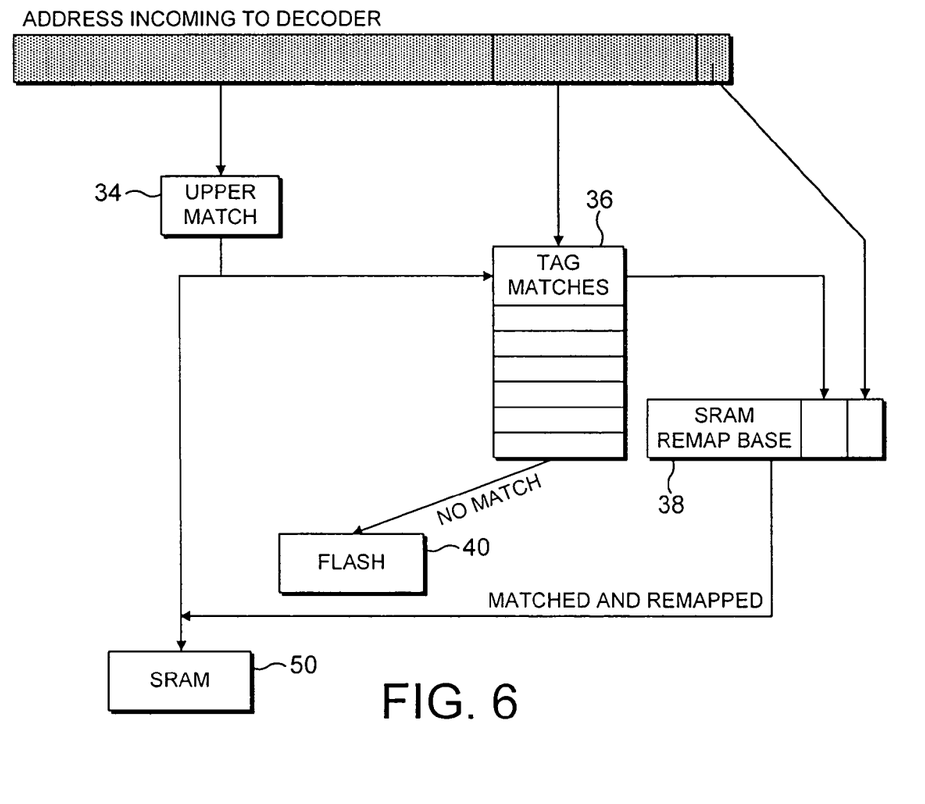
FIG. 6 schematically illustrates a data access request remapping device according to an embodiment of the present invention with a fixed small Flash area.

FIG. 6 illustrates a further embodiment of the invention. This embodiment comprises a fixed small Flash. This embodiment is similar to that of FIG. 3. An initial upper match 52 is performed on a portion of the address comprising the higher order bits. If a match occurs, then the data is stored in the Flash. As the Flash is small, there is no segmenting of the area into areas where data items may be remapped and those where they may not. Thus, the "block match" of FIGS. 4 and 5 is omitted and a tag match is performed immediately. This tag match is identical to that described with respect to FIGS. 4 and 5.

Figure 7:
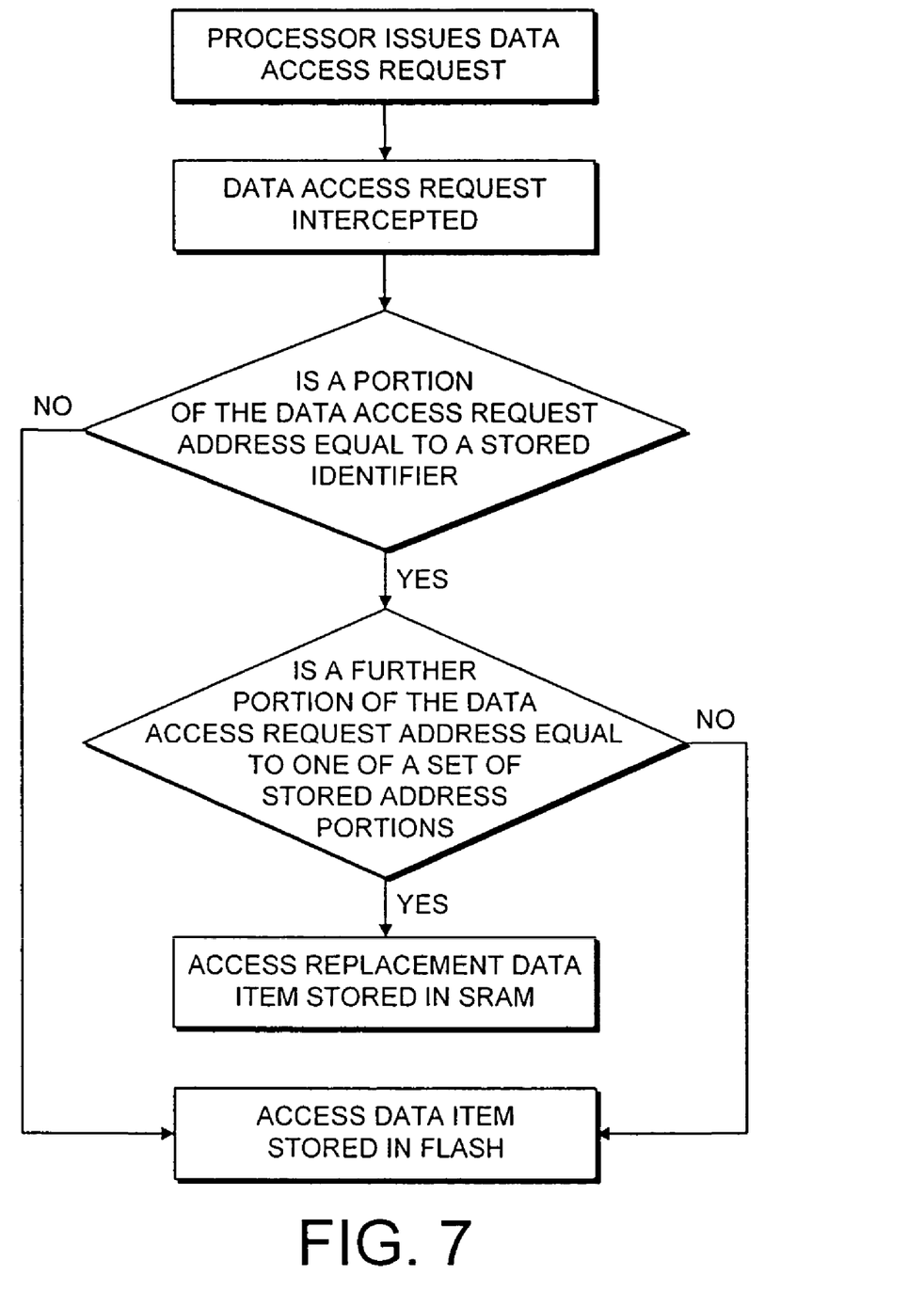
FIG. 7 schematically illustrates a flow diagram illustrating the main steps followed by a method according to an embodiment of the present invention.

FIG. 7 illustrates a flow diagram giving an outline of the steps performed by an embodiment of the present invention. Initially the processor issues a data access request and this is intercepted. A portion of an address of the data access request is then compared to a stored identifier and if they are not equal the data item on the Flash is accessed. If they are equal then the data item to be accessed is stored on a patchable area within the Flash and a further lower bit portion of the address is compared to a stored "tag". If there is no match then this indicates that there is no stored replacement data for this data item and the data item on the Flash is accessed. If there is a match then a replacement data item is stored in the SRAM and it is this that is accessed.

Figure 8:
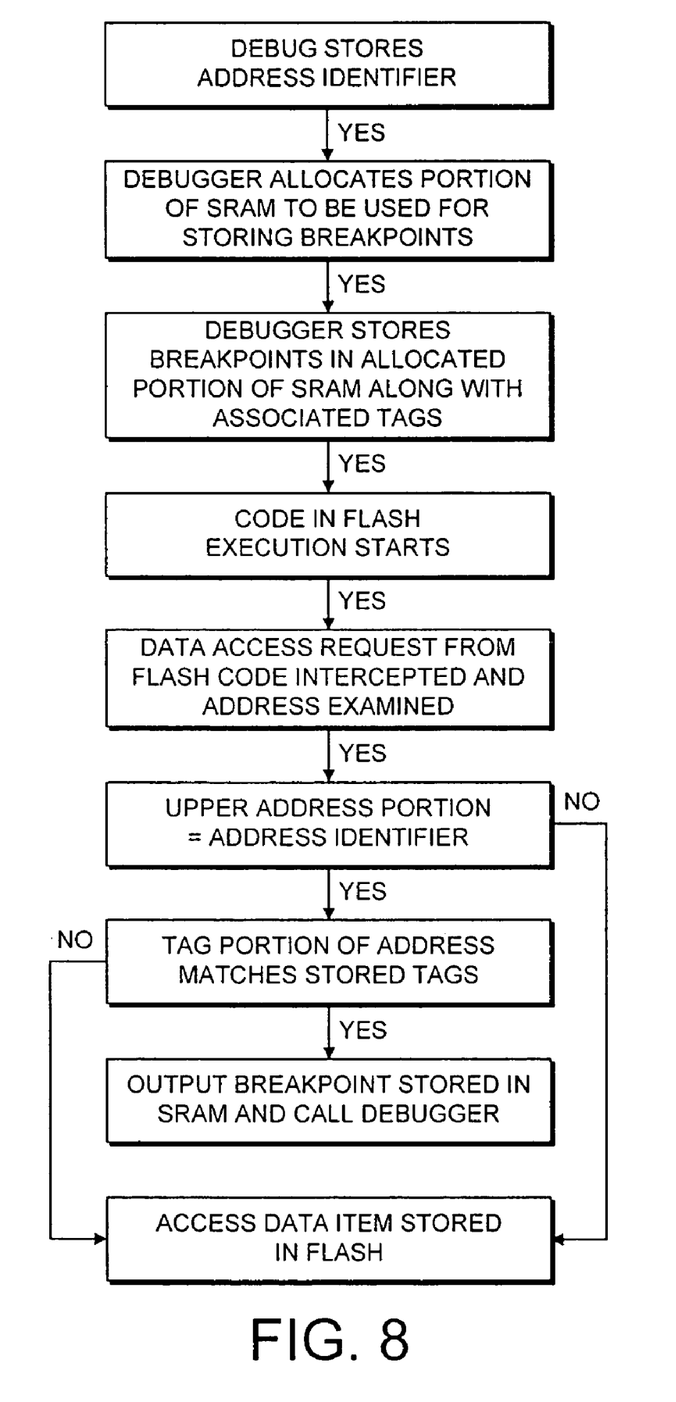
FIG. 8 shows a flow diagram outlining the steps performed during debugging of code executed in the Flash.

FIG. 8 shows a flow diagram outlining the steps performed during debugging of code executed in the Flash. In this embodiment, the debugger sets an address identifier identifying addresses of data items within the Flash that may need to be remapped. The debugger then defines a portion of the SRAM that can be used to store breakpoints. The debugger then stores these breakpoints along with their associated tags, which generally comprise a portion of the address of the data item that the breakpoint is to replace. When the code in the Flash is then executed it is ready to be debugged. All data access requests to the Flash are intercepted and if the upper address portion of the data access request matches the stored address identifier then this indicates that the data item may need to be replaced by a breakpoint. A further portion of the address is then compared with stored tags and if there is a match then the corresponding region of the SRAM is accessed and a breakpoint is forwarded to the processor. If there is no match with either the identifier or the tag then the data item stored at that address in the Flash is accessed and forwarded to the processor. Thus, as far as the processor is concerned breakpoints have effectively been inserted into code within the Flash.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method for remapping selected data access requests issued by a processor for accessing data items stored on a ROM, said method comprising the following steps:
   (ii) storing at least one replacement data item corresponding to at least one data item and different to said at least one data item in one portion of a RAM memory block, said RAM memory block having a further portion that is accessible by said processor when performing processes other than said remapping;
   (iii) intercepting a data access request from said processor to said ROM before said data access request accesses said ROM;
   (iv) comparing at least a portion of an address of said intercepted data access request with a stored at least one identifier, said stored at least one identifier identifying an address of at least one data item stored on said ROM, and depending on said comparison either:
   ($v_a$) remapping said data access request to said RAM memory block, such that a replacement data item stored on said memory block is accessed and said ROM is not accessed if said comparison indicates said at least a portion of an address to correspond to an address identified by said stored at least one identifier; or
   ($v_b$) if said comparison indicates said at least a portion of an address not to be an address identified by said stored at least one identifier accessing a data item located at a position corresponding to said address on said ROM.

2. A method according to claim 1, comprising a further step, step (i) said step being performed before step (ii) and comprising:
   (i) storing at least one identifier identifying an address of at least one data item stored on said ROM.

3. A method according to claim 2, wherein step (ii) of said method is performed in response to a request received from a processor.

4. A method according to claim 1, said method comprising the further step of:

defining said one portion of a RAM memory block for storage of said at least one replacement data item prior to performing step (ii).

5. A method according to claim 1, wherein step (ii) comprises storing a plurality of replacement data items in said RAM corresponding to a plurality of data items stored in said ROM, and storing associated with each of said plurality of replacement data items at least a portion of said address of said corresponding data item.

6. A method according to claim 5, wherein prior to performing step($v_a$) comparing said associated stored at least a portion of said address with a corresponding at least a portion of said data item address, and if said comparison does not match performing step ($v_b$) of said method rather than step ($v_a$).

7. A method according to claim 1, wherein said at least one identifier comprises a portion of said address of said at least one data item.

8. A method according to claim 1, comprising an additional step (i) performed prior to step (ii), wherein step (i) comprises storing one identifier, said identifier identifying a data area on said ROM in which a plurality of data items are stored.

9. A method according to claim 1, said method comprising a further step performed after step (v) of:
(vi) forwarding said accessed data to said processor.

10. A method according to claim 1, wherein said at least one replacement data item comprises a breakpoint instruction, such that access to said at least one replacement data item causes execution of said processor steps for debug or test.

11. A method according to claim 1, wherein said at least one data item comprises a literal, instruction or other data, and said at least one replacement data item comprises a new literal, instruction or other data to replace said literal, instruction or other data stored in said ROM.

12. A method according to claim 1, wherein said ROM comprises a Flash device or other programmable ROM.

13. A method according to claim 12, said method comprising a further step, said further step performed after step (v), said further step comprised of:
(vi) forwarding said accessed data to said processor, wherein step (vi) comprises a delaying step prior to forwarding said accessed data item to said processor, said delaying step being arranged such that said data is forwarded to said processor with a timing that is equal to the timing of data accesses to said Flash device.

14. A method according to claim 1, wherein said RAM memory block comprises an SRAM.

15. A method for remapping selected data access requests issued by a processor for accessing data items stored on a ROM, said method comprising the following steps:
(ii) storing at least one replacement data item corresponding to at least one data item and different to said at least one data item in a portion of a RAM memory block, said RAM memory block being accessible by said processor, and said portion having been defined for storage of said at least one replacement data item;
(iii) intercepting a data access request from said processor to said ROM;
(iv) comparing at least a portion of an address of said intercepted data access request with a stored at least one identifier, said stored at least one identifier identifying an address of at least one data item stored on said ROM, and depending on said comparison either:
($v_a$) remapping said data access request to said RAM memory block, such that a replacement data item stored on said memory block is accessed if said comparison indicates said at least a portion of an address to correspond to an address identified by said stored at least one identifier; or
($v_b$) if said comparison indicates said at least a portion of an address not to be an address identified by said stored at least one identifier accessing a data item located at a position corresponding to said address on said ROM, wherein said at least one identifier comprises a portion of said address of said at least one data item, wherein step (ii) comprises storing a plurality of replacement data items in said RAM corresponding to a plurality of data items stored in said ROM, and storing associated with each of said plurality of replacement data items at least a portion of said address of said corresponding data item, wherein said identifier comprises a different portion of said address from said portion of said address that is stored associated with said replacement data item.

16. A method according to claim 15, wherein said identifier comprises a high order portion of said address and said portion of said address that is stored associated with said replacement data item comprises a lower order portion of said address.

17. A data processing apparatus comprising:
a processor;
a read only memory for storing data items, said read only memory being accessible by said processor;
a memory block of RAM, accessible by said processor, and having one portion for storing at least one replacement data item corresponding to at least one data item stored in said ROM and different to said at least one data item and a further portion accessible by said processor performing processes other than accessing said at least one replacement data item;
a data request interceptor comprising a data store and a comparator; wherein
said data store stores at least one identifier, said at least one identifier identifying an address of said at least one data item stored on said ROM; and
said data request interceptor for intercepting data access requests issued by said processor to said ROM before said data access request accesses said ROM and, using said comparator, compares at least a portion of an address of said intercepted data access request with said stored at least one identifier and, depending on said comparison, said data request interceptor either accesses data located at a position corresponding to said intercepted data access request address on said ROM if said comparison indicates said at least a portion of an address not to be an address identified by said at least one stored identifier; or remaps said data access request to access said at least one replacement data item and does not access said ROM if said comparison indicates said at least a portion of an address to be an address identified by said at least one stored identifier.

18. A data processing apparatus according to claim 17, wherein said data store comprising said identifier is a ROM.

19. A data processing apparatus according to claim 17, wherein said data request interceptor defines said one portion of said RAM memory block, and wherein said data request interceptor stores said at least one replacement data item in said defined portion.

20. A data processing apparatus according to claim 19, wherein said data request interceptor stores a plurality of replacement data items in said defined portion of said RAM, said plurality of replacement data items corresponding to a plurality of data items stored in said ROM, and to store associated with each of said plurality of replacement data items at least a portion of said address of said corresponding data item, said data request interceptor identifying said replacement data item to be accessed using said associated stored at least a portion of said address.

21. A data processing apparatus according to claim 20, wherein said comparator compare said associated stored at least a portion of said address with a corresponding at least a portion of said data item address, and if said address matches to access said replacement data item stored in said RAM and if said address does not match to access said data item stored in said ROM.

22. A data processing apparatus according to claim 17, wherein said at least one identifier comprises a portion of said address of said at least one data item.

23. A data processing apparatus according to claim 17, wherein said data store stores said identifier, said identifier identifying a data area on said ROM in which a plurality of data items are stored.

24. A data processing apparatus according to claim 17, said data request interceptor, after accessing said data, forwarding said accessed data to said processor.

25. A data processing apparatus according to claim 17, wherein said at least one replacement data item comprises a breakpoint instruction, such that access to said at least one replacement data item initiates execution of said processor steps for debug or test.

26. A data processing apparatus according to claim 17, wherein said at least one data item comprises a literal, instruction or other data, and said at least one replacement data item comprises a new literal, instruction or other data to replace said literal, instruction or other data stored in said ROM.

27. A data processing apparatus according to claim 17, wherein said ROM comprises a Flash device or other programmable ROM.

28. A data processing apparatus according to claim 27, said data request interceptor, after accessing said data, forwarding said accessed data to said processor, wherein said data access interceptor is operable to delay forwarding said accessed data to said processor such that said data is forwarded with a timing that is equal to the timing of data accesses to said Flash device.

29. A data processing apparatus according to claim 17, wherein said RAM memory block comprises an SRAM.

30. A data processing apparatus comprising:
a processor;
a read only memory for storing data items, said read only memory being accessible by said processor;
a memory block of RAM, accessible by said processor, for storing at least one replacement data item corresponding to at least one data item stored in said ROM and different to said at least one data item in a portion of a RAM memory block, said portion having been defined for storage of said at least one replacement data item;
a data request interceptor comprising a data store and a comparator; wherein
said data store stores at least one identifier, said at least one identifier identifying an address of said at least one data item stored on said ROM; and said data request interceptor intercepts data access requests issued by said processor to said ROM and, using said comparator, compares at least a portion of an address of said intercepted data access request with said stored at least one identifier and, depending on said comparison, said data request interceptor either accesses data located at a position corresponding to said intercepted data access request address on said ROM if said comparison indicates said at least a portion of an address not to be an address identified by said at least one stored identifier; or remaps said data access request to access said at least one replacement data item if said comparison indicates said at least a portion of an address to be an address identified by said at least one stored identifier, wherein said data store stores said identifier, said identifier identifying a data area on said ROM in which a plurality of data items are stored, wherein said comparator compares said associated stored at least a portion of said address with a corresponding at least a portion of said data item address, and if said address matches to access said replacement data item stored in said RAM and if said address does not match to access said data item stored in said ROM, wherein said identifier comprises a different portion of said address from said portion of said address that is stored associated with said replacement data item.

31. A data processing apparatus according to claim 30, wherein said identifier comprises a high order portion of said address and said portion of said address that is stored associated with said replacement data item comprises a lower order portion of said address.

32. A method for remapping selected data access requests issued by a processor for accessing data items stored on a ROM, said method comprising the following steps:
(ii) storing at least one replacement data item corresponding to at least one data item and different to said at least one data item in a portion of a RAM memory block, said RAM memory block being accessible by said processor, and said portion having been defined for storage of said at least one replacement data item;
(iii) intercepting a data access request from said processor to said ROM;
(iv) comparing at least a portion of an address of said intercepted data access request with a stored at least one identifier, said stored at least one identifier identifying an address of at least one data item stored on said ROM, and depending on said comparison either:
($v_a$) remapping said data access request to said RAM memory block, such that a replacement data item stored on said memory block is accessed if said comparison indicates said at least a portion of an address to correspond to an address identified by said stored at least one identifier; or
($v_b$) if said comparison indicates said at least a portion of an address not to be an address identified by said stored at least one identifier accessing a data item located at a position corresponding to said address on said ROM.

* * * * *